United States Patent [19]

Tsukamoto et al.

[11] Patent Number: 4,977,406

[45] Date of Patent: Dec. 11, 1990

[54] PLANAR ANTENNA

[75] Inventors: Katsuya Tsukamoto; Toshio Abiko, both of Osaka, Japan

[73] Assignee: Matsushita Electric Works, Ltd., Osaka, Japan

[21] Appl. No.: 282,069

[22] Filed: Dec. 9, 1988

[30] Foreign Application Priority Data

Dec. 15, 1987 [JP] Japan .................. 62-316684

[51] Int. Cl.⁵ .............................................. H01Q 1/38
[52] U.S. Cl. ............................ 343/700 MS; 343/846
[58] Field of Search .............. 343/700 MS, 795, 778, 343/770, 771, 824, 814, 846; 333/116, 128, 136

[56] References Cited

U.S. PATENT DOCUMENTS

| Re. 29,911 | 2/1979 | Munson | 343/700 MS |
|---|---|---|---|
| 3,587,110 | 6/1971 | Woodward | 343/814 |
| 3,681,769 | 8/1972 | Perrotti et al. | 343/814 |
| 4,079,268 | 3/1978 | Fletcher et al. | 343/700 MS |
| 4,686,535 | 8/1987 | Lalezari | 343/700 MS |
| 4,761,654 | 8/1988 | Zaghloul | 343/700 MS |

Primary Examiner—Michael C. Wimer
Attorney, Agent, or Firm—Burns, Doane, Swecker & Mathis

[57] ABSTRACT

A planar antenna is provided, at optional power-supply terminals in power-supply circuit pattern provided in parallel with radiation circuit pattern and ground conductor layer, with additional power-supply terminals having a phase difference of an integer multiple of wavelength λg, while the radiation circuit pattern is provided with additional radiation elements respectively corresponding to each of the additional power-supply terminals, whereby the planar antenna can be made to attain a high gain with the minimum dimension in accordance with the field strength of satellite broadcasting electric waves.

2 Claims, 4 Drawing Sheets

PLANAR ANTENNA

TECHNICAL BACKGROUND OF THE INVENTION

This invention relates generally to planar antennas and, more particularly, to a planar antenna which can be properly subjected to design modification in accordance with the field strength of satellitic broadcasting electric waves.

The planar antennas of the kind referred to are effectively utilized in receiving polarized waves transmitted as carried on SHF band, in particular, a band of 12 GHz or more from a geostationary broadcasting satellite launched into cosmic space to be 36,000 Km high from the earth.

DISCLOSURE OF PRIOR ART

While parabolic antennas erected on the roof or the like positions of house buildings have been generally utilized as the antenna for receiving the electric waves from the geostationary satellite, the parabolic antennas have been defective in that they are susceptible to strong wind and easily fall down due to their bulky three dimensional structure. Additional means for stably supporting them have to be employed, and such supporting means further requires high mounting costs and still troublesome installation labor.

In attempt to eliminate these problems of the parabolic antennas, there has been suggested in Japanese Pat. Application Laid-Open Publication No. 99803/1982 (corresponding to U.S. Pat. No. 4,475,107 or German Patent Offenlegungsschrift No. 314900.2) a planar antenna which is flattened in the entire configuration, according to which the structure can be much simplified and it is possible to directly mount the antenna on an outdoor wall or a like position of the house buildings to be inexpensive.

Further, the planar antenna has been demanded to be of a high gain, for which purpose various attempts have been made to reduce insertion loss. Disclosed in, for example, U.S. Pat. application Ser. No. 15,009, now U.S. Pat. No. 4,851,855 of K. Tsukamoto et al (to which U.K. Patent Application No. 87 03640, German Patent Application P 37 06 051.1 or French Patent Application No. 87 02421 corresponds) prior to the present invention is a planar antenna, in which power-supply circuit and radiation circuit are not connected directly to each other but are electromagnetically coupled for supplying power from the power-supply circuit to the radiation circuit, while both circuits, as well as a ground conductor, are respectively carried on each of insulating plates which are separated from one another by means of a space retaining means. With this arrangement, therefore, the power supply circuit can be also disposed in the space thus retained so as to minimize the loss, to improve the assembling ability, and the insertion loss can be effectively lowered.

Further, prior to the present invention, there has been suggested in U.S. Pat. application Ser. No. 88,265, now U.S. Pat. No. 4,816,835 of T. Abiko et al (to which U.K. Patent Application No. 87 19750, German Patent Application P 37 29 750, or French Patent Application No. 87 12274 corresponds) another planar antenna in which a radiation circuit is provided with many slots in which patch elements are disposed, and the radiation circuit is electromagnetically coupled at the patch elements in the slots to opposed power supply terminals of a power supply circuit, so as to further decrease the loss while incrementally improving the assembling ability.

According to the foregoing it is possible to reduce the insertion loss and to improve the assembling ability for rendering the antenna to be highly mass-produceable, but a drawback has been still left unsolved in respect that the antenna has been unable to be subjected to design modification in the optimum gain or the minimum dimension in accordance with the field strength of the satellitic broadcasting electric waves.

FIELD OF ART

A primary object of the present invention is, therefore, to provide a planar antenna of minimal dimension while retaining a high antenna gain, keeping any unnecessary enlargement of size restrained, and thus improving the economic property.

According to the present invention, this object of the invention can be attained by means of a planar antenna for receiving polarized waves transmitted as carried on SHF band from a satellite, in which a power-supply circuit pattern formed by a conductive material includes power-supply terminals, a radiation circuit pattern also formed by a conductive material includes radiation elements respectively corresponding to each of the power-supply terminals in the power-supply circuit pattern, and a ground conductor layer is disposed with respect to the power-supply and radiation circuit patterns with an inductive dielectric layer interposed between them, characterized in that the power supply circuit pattern is provided at optional power-supply terminals with additional power supply terminals having a phase difference of wavelength an integer multiple of $\lambda g$, and the radiation circuit pattern is provided with additional radiation elements respectively corresponding to each of the additional power-supply terminals.

Other objects and advantages of the present invention shall be made clear in following description of the invention detailed with reference to embodiments shown in accompanying drawings.

Figure 1:
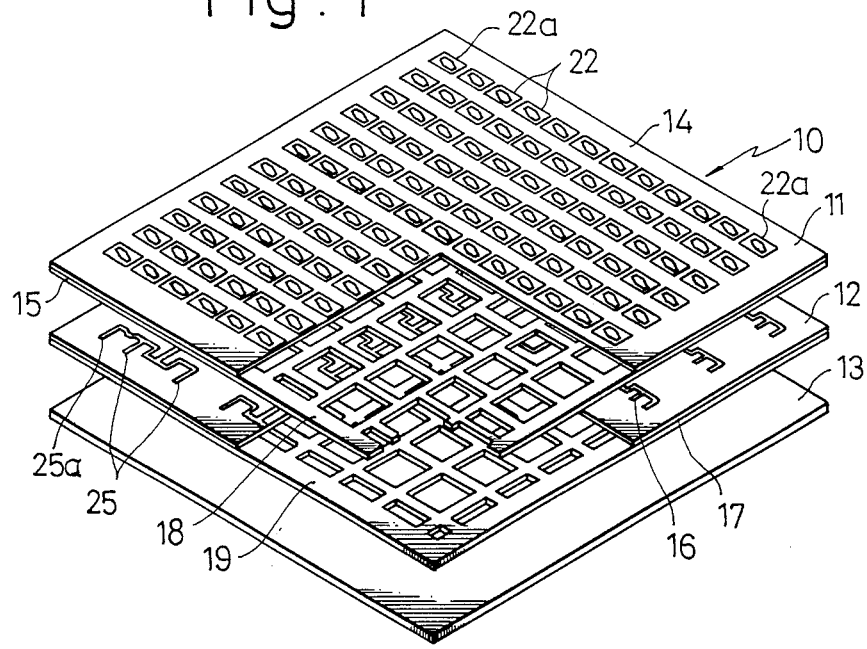
FIG. 1 is a perspective view in an embodiment of the planar antenna according to the present invention, with its constituents shown disassembled and partly omitted.

While the present invention shall now be explained with reference to the embodiments shown in accompanying drawings, it should be appreciated that the intention is not to limit the invention only to these embodiments shown but rather to include all modifications, alterations and equivalent arrangements possible within the scope of appended claims.

DISCLOSURE OF PREFERRED EMBODIMENTS

Referring to FIGS. 1 through 5, a planar antenna 10 according to the present invention generally comprises a radiation circuit plate 11, a power-supply circuit plate 12 and a ground conductor layer plate 13. The radiation circuit plate 11 includes a radiation circuit pattern 14 which is formed by a layer of such conducting material as copper, aluminum, astatine, iron, gold and the like on a surface of a synthetic resin layer 15 and, if required, coated with a synthetic resin over the top surface. The power-supply circuit plate 12 includes a power-supply circuit pattern 16 formed by the same material as the radiation circuit pattern 14 on a surface of a synthetic resin layer 17 and, if required, also coated with a synthetic resin over the top surface. The ground conductor layer plate 13 is formed by, for example, the same material as the radiation circuit pattern 14 on the whole and, if required, covered by a synthetic resin over top and bottom surfaces.

Figure 3:
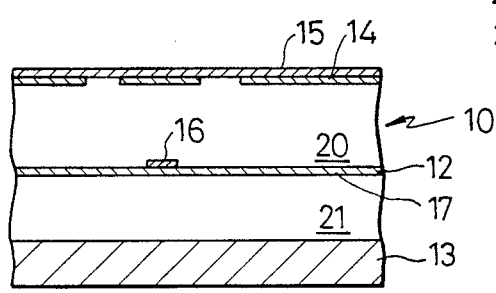
FIG. 3 is a fragmentary sectioned view as magnified of the planar antenna shown in FIG. 1.
Figure 2:
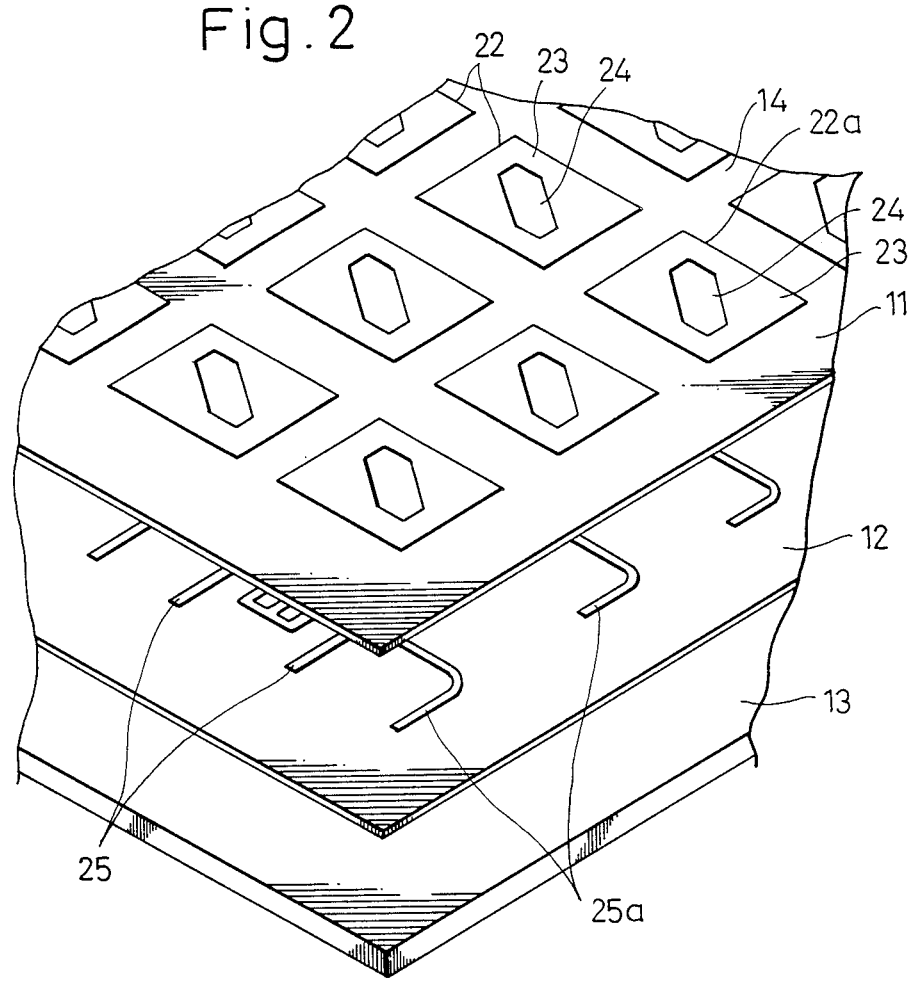
FIG. 2 is a fragmentary perspective view as magnified of the planar antenna of FIG. 1.

Between the radiation circuit plate 11 and the power-supply circuit plate 12, and between the power-supply circuit plate 12 and the ground conductor layer plate 13 as well, there are properly interposed such space-retaining means as spacers 18 and 19 of, for example, a synthetic resin formed into a lattice shape as seen in FIG. 1 or in a honeycomb shape, so as to define spaces 20 and 21 as seen in FIG. 3. In this case, such a gas as air present in the spaces 20 and 21 and flowing in and out thereof can act as a low loss dielectric member. On or above the top or front surface acting as an antenna surface of the planar antenna 10, if required, there may be provided a radome made mainly of a foamed plastic permeable to electric waves so as to cover and protect the surface, taking into consideration a possible outdoor installation of the antenna. With this covering by the radome, not only the antenna surface but also the entire planar antenna 10 may be made to have a good strength, and it is made possible to effectively prevent the height of the spaces 20 and 21 from being decreased due to weathering.

Figure 5:
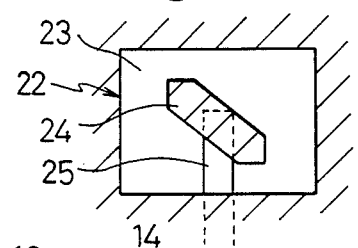
FIG. 5 is an explanatory view for electromagnetic coupling between a power-supply terminal of a power supply circuit pattern and a radiation element of a radiation circuit pattern for use with polarized waves.

Further, the radiation circuit pattern 14 on the radiation circuit plate 11 comprises many radiation elements 22 which are respectively include a generally rectangular slot 23 made in the conducting layer of the pattern 14 and a patch element 24 formed within the slot 23 with the same conducting material as the layer of the pattern 14 to extend along a diagonal line of the slot 23 or, in other words, in a form of a smaller rectangle or square cut off at diagonally opposing corners, as shown in FIG. 5, and the radiation elements 22 are respectively electromagnetically coupled to each of power-supply terminals 25 in the power-supply pattern 16 of the power-supply circuit plate 12, as seen in FIGS. 3 and 5.

The number of the thus coupled sets of the radiation elements 22 and power-supply terminals 25 should normally be $2^n$ (n being a positive integer) and, when the radiation circuit and power-supply circuit patterns 14 and 16 are of $2^8 = 256$ sets, the antenna gain thereby obtainable will be insufficient but, when the patterns are of $2^9 = 512$ sets, the gain largely exceeds a desired gain to be too large in size. In the case of the parabolic (or dish) antenna, on the other hand, the same can be designed in adaption to the field strength of the satellitic broadcasting waves by properly varying opening diameter of reflection plate of the antenna to be, for example, 45 cm, 50 cm, 60 cm, ... and, in this connection, the planar antenna has been likely to be disadvantageous as compared with the parabolic antenna.

According to a remarkable feature of the present invention, here, the power-supply circuit pattern 16 of the power-supply circuit plate 12 is provided with additional power-supply terminals 25a respectively extended from the base portion of each power-supply terminal 25 in the pattern 16 and having a phase difference of an integer multiple of the wavelength $\lambda g$ of the satellite broadcasting waves, while the radiation circuit pattern 14 of the radiation circuit plate 11 is provided with additional radiation elements 22a of the same arrangement as the radiation elements 22 and to be electromagnetically coupled to the additional power-supply terminals 25a in the pattern 16. In the present instance, sets of $^4 = 16$ sets of the power-supply terminals 25 and radiation elements 22 are provided with 8 sets of the additional power-supply terminals 25a and additional radiation elements 22a so that an antenna unit of 24 sets of the elements 22 and terminals 25 will be formed, and 128 of such antenna units are provided for an electric power supply from the respective power-supply terminals 25 and 25a in in-phase relationship to the respective radiation elements 22 and 22a, and consequently a planar antenna having 384 sets of the radiation elements and power-supply terminals, that is, of a type having an intermediate number of the sets between $2^8$ and $2^9$ can be thereby obtained.

Figure 4:
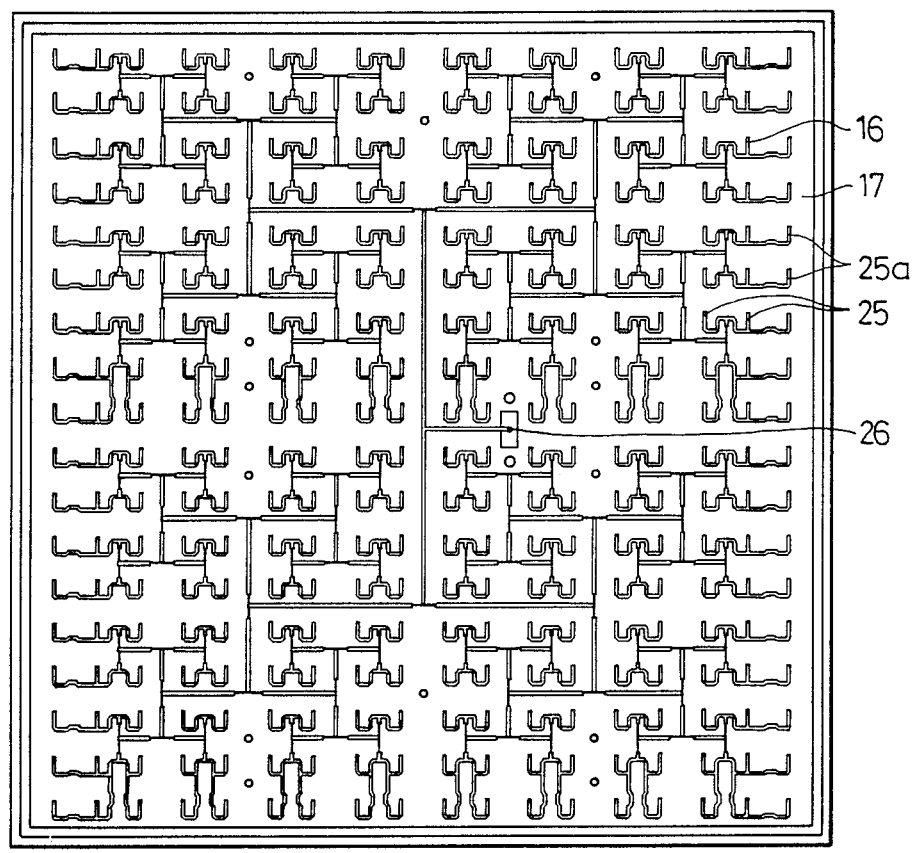
FIG. 4 is a plan view of a power-supply circuit plate in the planar antenna of FIG. 1.

In the foregoing arrangement, it is preferable that an electric power is supplied to the power-supply circuit pattern 16 on the power-supply circuit plate 12 directly through a waveguide 26 provided in the center of the plate 12, as seen in FIG. 4, but the supply may be realized even through an electromagnetic coupling of a power-supply end of the pattern 16 to a source power supply end. Further, while the spacer 18 or the like is interposed between the power-supply circuit plate 12 and the radiation circuit plate 11 to define the space 20, both plates 11 and 12 may be disposed close to each other without any space. While the power-supply terminals 25 and 25a and the patch elements 24 of the radiation elements 22 and 22a are referred to as being electromagnetically coupled, further, it may be possible to provide directly a path element to each power-supply terminals in a simplified arrangement of the planar antenna.

Figure 6:
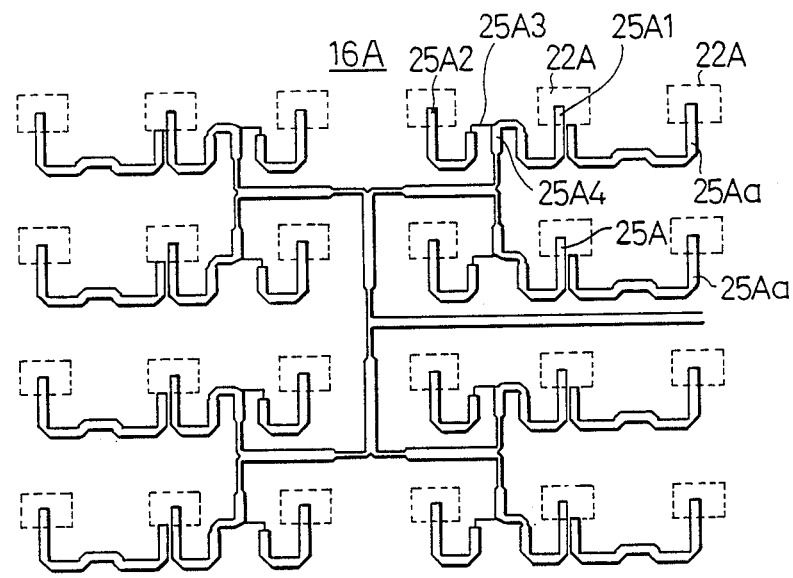
FIGS. 6 and 7 are fragmentary plan views of the power supply circuit pattern in other embodiments according to the present invention.

As shown in FIG. 6, on the other hand, it may be possible to provide to power-supply circuit pattern 16A additional power-supply terminals 25Aa without being directly extended respectively from each of power-supply terminals 25A but electromagnetically coupled thereto. In an event where the additional power-supply terminals 25Aa are provided respectively to one 25A1 of paired power-supply terminals with the other 25A2, it is preferable that a non-even shunted circuit portion 25A3 formed by means of 2:1 power-divider is provided for the other power-supply terminal 25A2 adjacent a shunt part 25A4 between the paired terminals 25A1 and 25A2, so as to avoid any unbalance in the supplied power to them. In the embodiment of FIG. 6, other arrangements and their operation are substantially the same as those in the foregoing embodiment.

Figure 7:
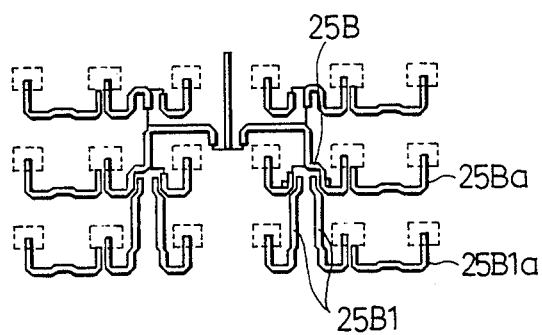

As shown in FIG. 7, further, paired additional power-supply terminals 25B1 and power-supply terminal 25B1a may be provided in multistage arrangement through the electromagnetic coupling so that an antenna unit of, for example, 8 elements including terminals 25B can be modified into an 18 element type antenna unit by means of a second stage of additional terminals 25B1 and 251Ba. In this case, the second stage additional power-supply terminals 25B1a may be provided as directly connected to the first stage additional power-supply terminal 25B1 which are electromagnetically coupled to terminals 25B. In the embodiment, other arrangements and their operation are substantially the same as those in the foregoing embodiment.

Figure 8:
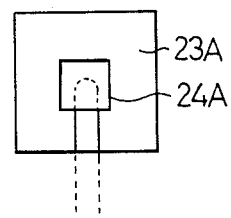
FIG. 8 is an explanatory for electromagnetic coupling between a power-supply terminal and a radiation element for use with linearly polarized waves.

In addition, the references have been made to the slot of the radiation element as being formed in a rectangular shape and the patch element in the slot as being extended in diagonal direction of the rectangular slot for adaption to the polarized wave reception and transmission, in the foregoing embodiments. However, it will be appreciated that, as shown in FIG. 8, the radiation element may comprise a square shaped slot 23A and a smaller square shaped patch element 24A disposed in the center of the slot, and the planar antenna can be adapted to the linear polarized wave reception and transmission.

EXAMPLE 1

The planar antenna 10 of the arrangement shown in FIGS. 1 to 5 of a suspended tri-plate type was prepared by arranging, in the radiation circuit plate 11, 384 sets of radiation elements 22 and additional radiation elements 22a respectively formed with the rectangular slots 23 of 15×13 mm and the patch elements 24 formed by cutting off diagonally opposing corners of a rectangular shape, forming the radiation circuit pattern 14 and power-supply circuit pattern 16 on a flexible printing circuit substrate by means of an etching process to form the radiation circuit and power-supply circuit plates 11 and 12, interposing between both plates 11 and 12 the spacer 18 of a foamed polyethylene sheet in the foaming rate of 20 times and 1.5 mm thick, and providing the ground conductor layer plate 13 formed with aluminum below the power-supply circuit plate 12 with the spacer 19 of the same material and thickness as the spacer 18 interposed between the plates 12 and 13.

Reception characteristics of this planar antenna with respect to the satellitic broadcast of 12 GHz were evaluated, results of which have shown that the antenna efficiency reached 60% and, from the view point of the gain, substantially intermediate reception characteristics between the antennas of the 256 element type and the 512 element type. According to this arrangement, it has been found that, as the planar antenna can be optionally designed to have any other number than $2^n$ of the set of the power-supply terminals and radiation elements in accordance with the field strength of the satellitic broadcasting electric waves, a planar antenna showing the optimum gain attainable in accordance with the field strength of the waves still with the minimum required dimension can be easily designed.

EXAMPLE 2

Except for that the spacers 18 and 19 of the same foamed polyethylene sheet as in Example 1 were perforated to be lattice shape as seen in FIG. 1, the same planar antenna as in Example 1 was prepared in the same manner, the reception characteristics of this planar antenna were evaluated, and it has been found that the antenna efficiency was improved to be 62% with a band expanded by about 200 MHz.

EXAMPLE 3

Antenna units respectively of 25 elements were prepared by providing, to the power-supply circuit pattern 16 formed on the power-supply circuit plate 12 in the planar antenna as in the foregoing Example 1, the additional power-supply terminals 25a for two radiation elements as connected in series and respectively with mutual phase difference of the wavelength $\lambda g$, as well as a further additional power-supply terminal 25a for one radiation element with a further phase difference by the wavelength $\lambda g$, while providing, to the radiation circuit pattern 14 on the radiation circuit plate 11, the additional radiation elements 22a to correspond to the provided additional power-supply terminals 25a. In this case, the non-even shunted circuit portions as the power divider were provided respectively adjacent the shunt part between the paired power-supply terminals in the power-supply circuit pattern. 16 pieces of the 25 element antenna units were assembled into a planar antenna of 400 element type.

The reception characteristics of this planar antenna with respect to the satellitic broadcasting of 12 GHz were evaluated, results of which have shown the antenna efficiency of 56% and the reception characteristics intermediate between the 256 element type and the 512 element type in respect of the gain could be obtained.

EXAMPLE 4

Except for that the power supply circuit pattern on the power-supply circuit plate as in the foregoing Example 1 was formed by electromagnetically coupling the additional power-supply terminals to the power-supply terminals as shown in FIG. 66, the same antenna as in Example 1, the planar antenna was prepared in the same manner as in Example 1, upon which the electromanetic coupling was achieved with a coupling length of about 6 mm. The reception characteristics evaluation for this planar antenna has shown that the antenna efficienty was 58% and substantially an intermediate reception characteristics between the 256 element type and 512 element type could be obtained.

What we claim as our invention is:

1. A planar antenna for receiving polarized waves of a wavelength $\lambda g$ transmitted as carried on SHF band from a satellite, the antenna comprising a power-supply circuit pattern including power-supply terminals and additional power-supply terminals respectively formed by a conductive material, said additional power-supply terminals are provided as optional power-supply terminals connected as extensions of said power-supply terminals and have a mutual phase difference of an integer multiple of wavelength $\lambda g$, a radiation circuit pattern including radiation elements and additional radiation elements respectively formed by a conductive material, said radiation elements corresponding respectively to each of said power-supply terminals and said additional radiation elements corresponding respectively to each of said additional power-supply terminals, and a ground conductor layer disposed with respect to said power-supply circuit pattern and radiation circuit pattern with a dielectric layer interposed between the power-supply circuit pattern and the ground conductor layer wherein a further dielectric layer is interposed between said power-supply circuit pattern and said radiation circuit pattern, whereby said power-supply and radiation circuit patterns and said ground conductor layer form a mutually spaced parallel relationship.

2. A planar antenna according to claim 1, wherein said dielectric layers each comprise a spacer formed by a lattice-shaped foamed plastic sheet.

* * * * *